United States Patent [19]
Denton

[11] 4,006,210
[45] Feb. 1, 1977

[54] METHOD OF MOLDING A SEAL WITH BALANCED PRESSURES ON A PREFORM

[75] Inventor: Dennis N. Denton, Bessemer City, N.C.

[73] Assignee: Garlock Inc., Palmyra, N.Y.

[22] Filed: Jan. 12, 1976

[21] Appl. No.: 648,169

[52] U.S. Cl. .............................. 264/250; 264/259; 264/266; 264/267; 264/275; 264/279; 264/296; 264/328
[51] Int. Cl.[2] ...................... B29C 5/00; B29D 3/00; B29G 3/00; B29H 9/00
[58] Field of Search ............ 425/110, 117, 29, 257, 425/383, 392, 125, 127, 129, 324 R, DIG. 47, 242 R; 29/33 R, 527.1–527.4; 277/152, 153, 177, 134, 212 F, 212 R, 227, 228, 235 R; 264/248, 250, 254, 263, 268, 271, 275, 279, 322, 328, 329, 255, 259, 296, 331, 339, 267, 266; 156/306, 212, 245, 293

[56] References Cited

UNITED STATES PATENTS

| | | | |
|---|---|---|---|
| 3,063,097 | 11/1962 | Jutzi | 29/33 |
| 3,754,846 | 8/1973 | Choate | 425/125 |
| 3,841,809 | 10/1974 | Tucker | 425/DIG. 47 |

*Primary Examiner*—Willard E. Hoag
*Attorney, Agent, or Firm*—Schovee & Boston

[57] ABSTRACT

A seal of the type having a metal shell with a cylindrical flange and with an elastomeric O.D. is transfer molded by positioning the cylindrical flange of the shell in a seal-forming cavity of the transfer mold such that it is directly axially in-line with the sprue holes of the mold, whereby the flow of elastomer into the cavity is split by the cylindrical flange into two streams, one adjacent the I.D. and one adjacent the O.D. of the cylindrical flange such that the fluid pressure against the cylindrical flange is equalized and distortion of the shell is substantially reduced or eliminated.

5 Claims, 1 Drawing Figure

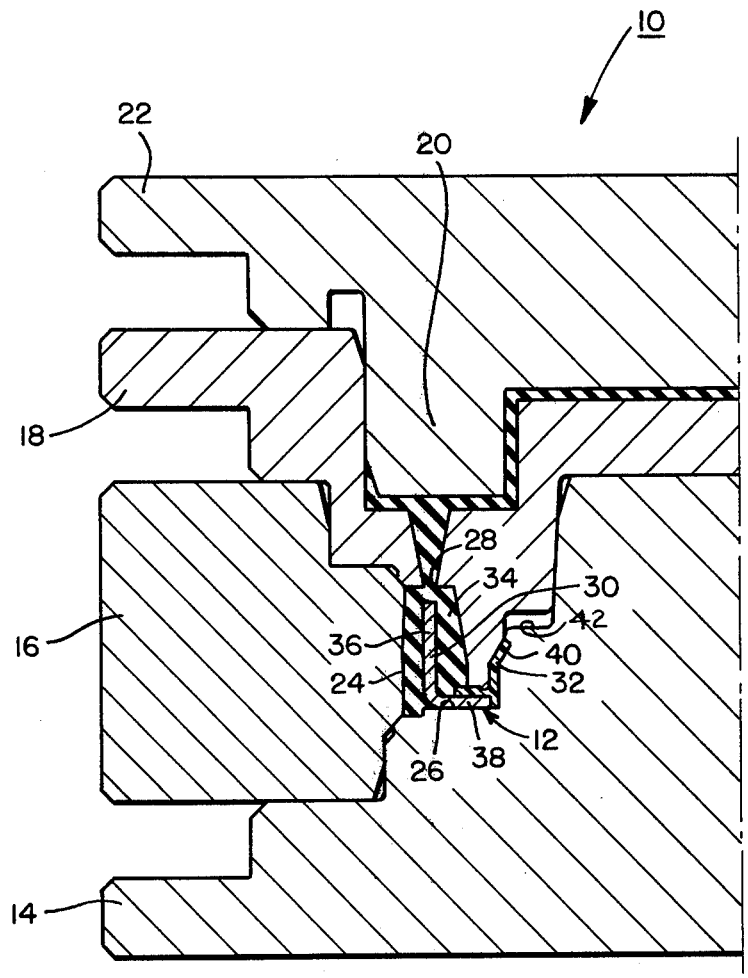

METHOD OF MOLDING A SEAL WITH BALANCED PRESSURES ON A PREFORM

BACKGROUND OF THE INVENTION

1. Field of the Invention

This invention relates to molding a seal of the type having a metal shell and an elastomeric O.D.

2. Description of the Prior Art

In prior art molding of seals of the type having a metal shell with a cylindrical flange and a radial flange and an elastomeric O.D., the fluid pressure exerted by the incoming flow of elastomeric material caused distortion and bending of the reinforcing shell. Such distortion can make it difficult to install the finished seal due to variable dimensions. This distortion can also result in a finished seal which is out-of-round and prone to leakage around the O.D. after installation in a machine bore.

It is an object of the present invention to provide a molding method which overcome the above-mentioned problems in the prior art. It is an object of the present invention to provide a molding method wherein the cylindrical flange of the metal shell is located in a seal-forming cavity of a transfer mold, directly axially in-line with the sprue holes of the mold to prevent distortion of the shell. Other objects, not specifically set forth above will become apparent from the following detailed description of the preferred embodiment of the present invention.

BRIEF DESCRIPTION OF THE DRAWING

The present invention will be more fully understood by reference to the following detailed description thereof, when read in conjunction with the attached drawing, wherein:

The FIGURE is a fragmentary half cross-sectional view of the apparatus according to the present invention.

DETAILED DESCRIPTION OF THE PREFERRED EMBODIMENT

With reference to the attached drawing, the FIGURE shows a mold 10 for forming a seal 12 according to the present invention. The mold 10 includes a lower plate 14, a center ring 16, an upper plate 18 having a recessed pot 20 in its upper surface, and a ram 22. The lower plate 14, the center ring 16 and the upper plate 18 define or provide therebetween a seal-forming cavity 24 having a lower radial surface 26 on the lower plate 14. The upper plate 18 includes a plurality of circumferentially spaced-apart sprue holes 28 extending axially downwardly from the pot 20 into the seal forming cavity 24.

The seal 12 is of the type including a shell 30, a polytetrafluoroethylene sealing element 32 and a body 34 of elastomer bonded to the shell 30 and to the element 32. The shell 30 includes a cylindrical flange 36 and a radial flange 38.

According to the present invention, the sprue holes 28 are located so as to be directly axially in-line with the cylindrical flange 36 of the shell 30, whereby the flange 36 will split the incoming flow of elastomer from the sprue holes 28 into two streams, one adjacent the I.D. and one adjacent the O.D. of the cylindrical flange, whereby the fluid pressure on the flange 36 is equalized and distortion of the shell is substantially reduced or eliminated.

Since transfer molds and transfer molding are well-known in the art, a detailed explanation here of the apparatus of the FIGURE and its operation is not necessary. However, briefly, the shell 30 is placed in the cavity 24 with the radial flange 38 on the surface 26 on the lower plate 14, and a flat ring shaped polytetrafluoroethylene member is concentrically placed above the shell 30 on a raised central portion 42 of the lower plate 14 and below the upper plate 18. A quantity (or blank prep form) of elastomer is placed in the pot 20 and the ram 22 is then moved downwardly closing the mold causing elastomeric material to flow into the cavity 24 through the sprue holes 28. The polytetrafluoroethylene ring is formed downwardly into the position shown in the FIGURE by a downwardly depending annular portion of the upper plate 18. The polytetrafluoroethylene sealing element 32 is hot formed in the mold and is bonded mechanically to the body 34 of elastomeric material simultaneously with curing or vulcanizing of the elastomeric material. The metal shell 30 gives rigidity to this type of seal. In addition, during the molding process any type of pumping elements, such as of a helix configuration can be provided and incorporated into a radially inner surface 40 of the polytetrafluoroethylene sealing element 32 adjacent the sealing lip thereof. The seal element can alternatively be all of elastomeric material, with or without pumping elements.

The invention has been described in detail with particular reference to the preferred embodiments thereof, but it will be understood that variations and modifications can be effected within the spirit and scope of the invention as described hereinabove and as defined in the appended claims. For example, while the terms "upper" and "lower" have been used to describe the elements in FIG. 1 it will be understood that these terms are only relative and the parts can be for example, turned upside-down. Further, the mold can include a lower mold member and an upper mold member defining the cavity 24 therebetween, rather than the specific number and shape of mold plates and rings shown. The elastomer is preferably fully cured in the mold but may be of a type which can be partially cured outside the mold. Also, alternatively, where a polytetrafluoroethylene element is included, it may be wholly or partially preformed.

I claim:

1. In a method for transfer molding a seal in which a cylindrical metal shell is supported in a mold cavity spaced from walls thereof, curable elastomer is introduced into said cavity and about said shell and cured, bonding the elastomer to said shell, the improvement comprising:

positioning said shell in said cavity and axially aligning said shell with plural sprue openings circumferentially spaced about said cavity so that elastomer flowing through each of said sprue openings is split into two streams by an edge portion of said shell, one stream flowing inside of the shell and the other of said streams flowing outside of said shell and introducing elastomer through said sprue openings, causing said elastomer to be split into streams flowing inside and outside of said shell, equalizing pressure against inner and outer surfaces thereof.

2. The method according to claim 1 wherein said shell also has a radial flange and including the step of positioning said radial flange on a lower radial surface of said cavity.

3. The method of claim 1 including positioning a polytetrafluorethylene sealing element in said mold and with heat and pressure both reshaping said element and bonding said element to said elastomer during closing of the mold.

4. The method according to claim 3 including the step of forming pumping means on a radially inner surface of said sealing element adjacent the sealing lip thereof, during closing of the mold.

5. The method of claim 1 in which said introducing step comprises placing a preformed elastomer blank in a chamber communicating with said mold and moving a ram into said chamber to transfer said elastomer to said mold cavity through said sprue holes.

* * * * *